(12) United States Patent
Jintaseranee et al.

(10) Patent No.: US 9,226,258 B2
(45) Date of Patent: Dec. 29, 2015

(54) WIRELESS DEVICE LOCATION DERIVED FROM BASE STATION SIGNALING

(71) Applicant: Sprint Communications Company L.P., Overland Park, KS (US)

(72) Inventors: Kosol Jintaseranee, San Jose, CA (US); Phyllis J. Reuther

(73) Assignee: Sprint Communications Company L.P., Overland Park, KS (US)

(*) Notice: Subject to any disclaimer, the term of this patent is extended or adjusted under 35 U.S.C. 154(b) by 283 days.

(21) Appl. No.: 13/660,754

(22) Filed: Oct. 25, 2012

(65) Prior Publication Data

US 2014/0120957 A1   May 1, 2014

(51) Int. Cl.
*H04W 24/00* (2009.01)
*H04W 64/00* (2009.01)

(52) U.S. Cl.
CPC ................................. *H04W 64/00* (2013.01)

(58) Field of Classification Search
CPC ....... H04W 8/26; H04W 36/32; H04W 64/00; H04W 36/04; H04W 24/00
See application file for complete search history.

(56) References Cited

U.S. PATENT DOCUMENTS

| | | | |
|---|---|---|---|
| 6,236,365 B1 | 5/2001 | LeBlanc et al. | |
| 6,701,132 B1 * | 3/2004 | Fukuzawa et al. | 455/67.16 |
| 7,366,492 B1 | 4/2008 | Ganesh | |
| 7,379,739 B2 | 5/2008 | Rajkotia et al. | |
| 7,812,766 B2 | 10/2010 | Leblanc et al. | |
| 2003/0096620 A1 | 5/2003 | Ozturk et al. | |
| 2004/0097234 A1 * | 5/2004 | Rajkotia et al. | 455/442 |
| 2005/0113082 A1 * | 5/2005 | Bender et al. | 455/422.1 |
| 2010/0197309 A1 * | 8/2010 | Fang et al. | 455/436 |
| 2011/0026497 A1 * | 2/2011 | Rezaiifar et al. | 370/335 |

FOREIGN PATENT DOCUMENTS

| | | |
|---|---|---|
| WO | 2003081930 | 10/2003 |
| WO | 2012075050 | 6/2012 |

* cited by examiner

*Primary Examiner* — Myron K Wyche

(57) ABSTRACT

Embodiments disclosed herein provide systems and methods for deriving a wireless device location from base station signaling. In a particular embodiment, a method provides monitoring signaling transmitted by a base station serving a plurality of wireless communication devices. The method further provides identifying a wireless communication device of the plurality of wireless communication devices from the signaling and identifying an active set carried in the signaling that is associated with the wireless communication device. The method further provides determining a location of the wireless communication device based on the active set.

12 Claims, 7 Drawing Sheets

WIRELESS DEVICE LOCATION DERIVED FROM BASE STATION SIGNALING

TECHNICAL BACKGROUND

Base stations in wireless communication networks use control signals to transfer basic information to connected wireless devices. This information may include notifications of incoming calls, messages, or data. Once a wireless device receives a notification message the wireless device may be assigned a traffic channel in order to perform necessary actions in accordance with the control signal notification.

Traffic channels are assigned using traffic channel assignment messages. Traffic channel assignment messages provide wireless devices with information about neighboring wireless sectors. The information, sometimes called an active set, indicates to the wireless devices which neighboring wireless sectors are available to the wireless devices for performing soft and softer handoffs. A wireless device that is capable of communicating with a base station that transfers traffic channel assignment messages is also capable of reading these traffic channel assignment messages regardless of whether those messages are intended for the device.

OVERVIEW

Embodiments disclosed herein provide systems and methods for deriving a wireless device location from base station signaling. In a particular embodiment, a method provides monitoring signaling transmitted by a base station serving a plurality of wireless communication devices. The method further provides identifying a wireless communication device of the plurality of wireless communication devices from the signaling and identifying an active set carried in the signaling that is associated with the wireless communication device. The method further provides determining a location of the wireless communication device based on the active set.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
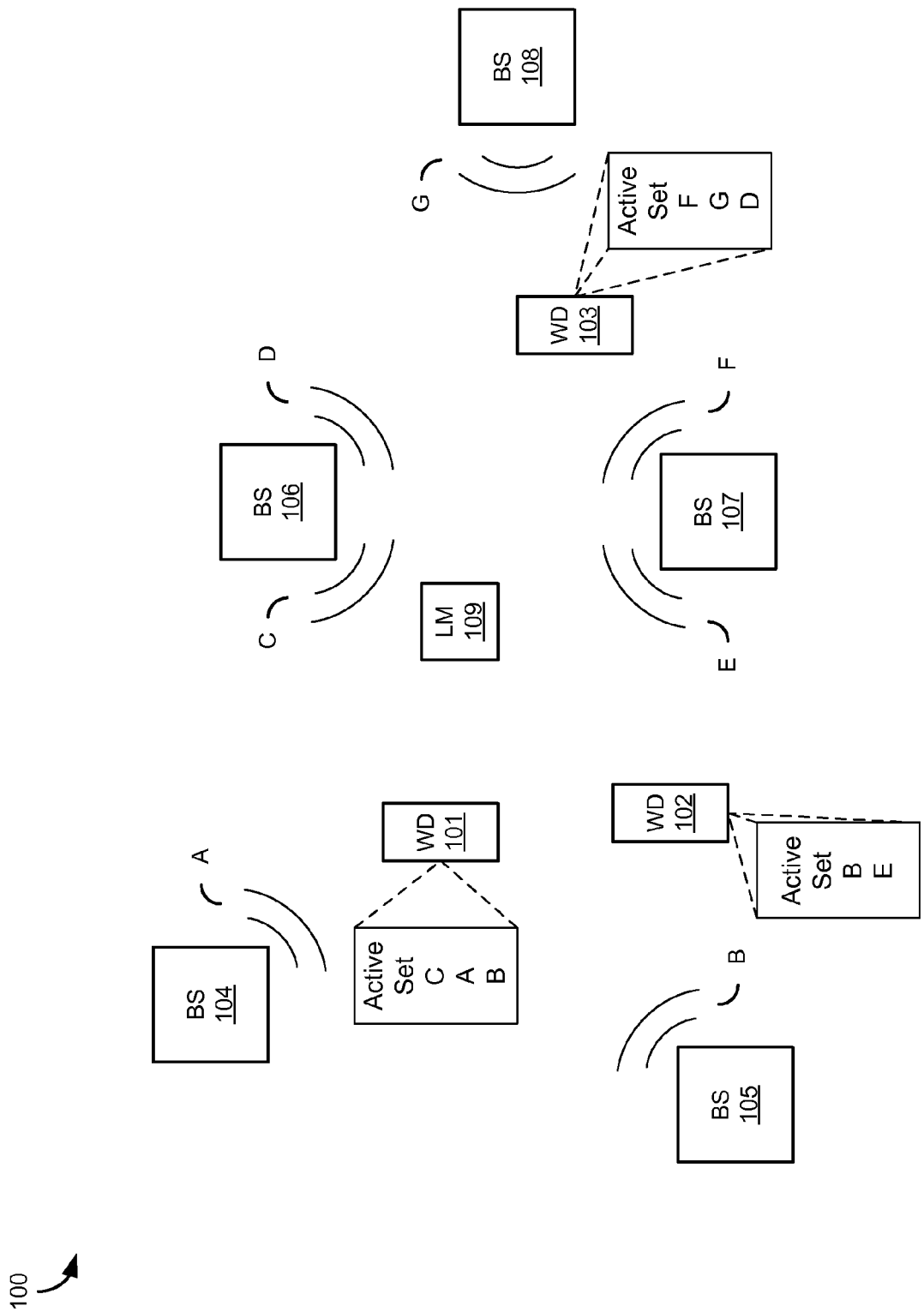
FIG. 1 illustrates a wireless communication system for deriving a wireless device location from base station signaling.

FIG. 1 illustrates wireless communication system 100 for deriving a wireless device location from base station signaling. Wireless communication system 100 includes wireless communication devices 101-103, base stations 104-108, and location monitor system 109. Base stations 104-108 provide wireless communication services in wireless sectors A-G. Base stations 104-108 may provide service to additional wireless sectors that are not shown in FIG. 1 for clarity. Wireless communication devices 101-103 communicate over wireless communication links with base stations 104-108. Location monitor system 109 may also communicate over the wireless communication links or may use other forms of communication links if communications are necessary.

In operation, when one of wireless devices 101-103 is assigned a traffic channel, a base station of base stations 104-108 that is presently servicing the wireless device transfers signaling to the wireless device that provides information to the wireless device regarding the traffic channel assignment. Base stations 104-108 may be operated by the same wireless network operator or by a number of different wireless network operators. This signaling includes an active set for the wireless device. While the signaling can be read by other wireless devices capable of receiving the signaling, an active set for one wireless device is most likely useless to another wireless device that is not under the same signal conditions.

The active set is a set of pseudo-random noise (PN) identifiers (IDs) for wireless sectors to which the wireless device can perform a soft or softer handoff. A soft handoff is a handoff between two sectors from two separate base stations while a softer handoff is a handoff between two sectors from the same base station. The active set may further include the PN ID for the wireless sector that is currently servicing the wireless device. The wireless device uses the active set to handoff to another wireless sector if a handoff is necessary to maintain communications with one of base stations 104-108

Figure 2:
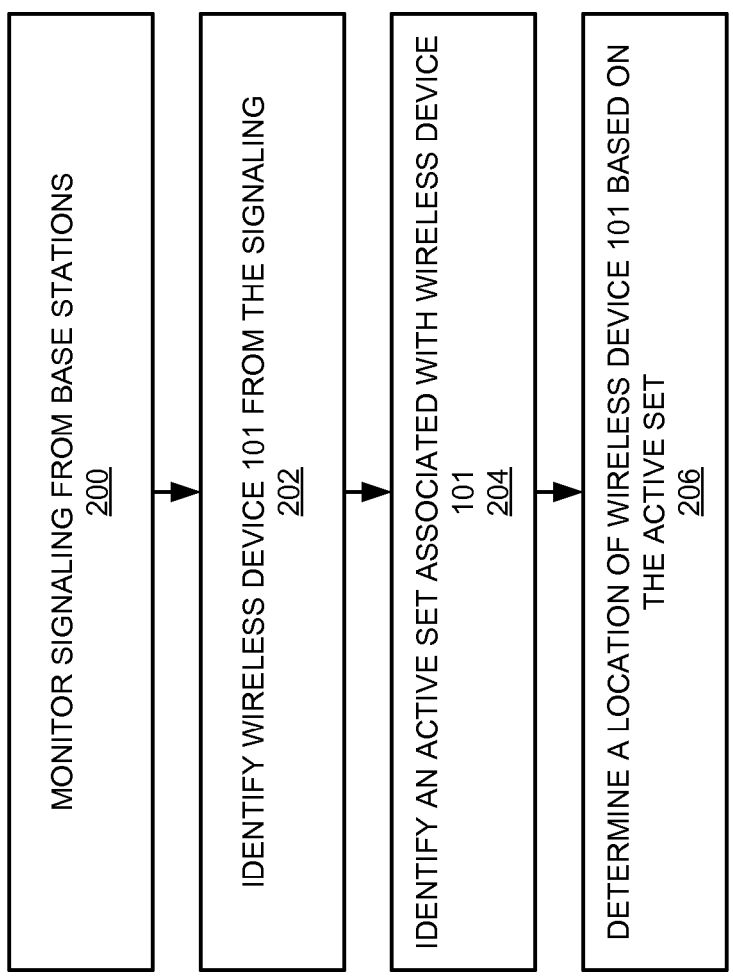
FIG. 2 illustrates the operation of the wireless communication system for deriving a wireless device location from base station signaling.

FIG. 2 illustrates the operation of wireless communication system 100 for deriving a wireless device location from base station signaling. Location monitor system 109 is positioned so that location monitor system 109 monitor signaling transmitted by a base station serving a plurality of wireless communication devices (step 200). The wireless communication devices may include wireless devices 101-103 but may also include additional wireless devices that are not pictured. In its current position, Location monitor system 109 is within wireless signal range of each of base stations 104-108. Therefore, while the signaling may be weak for base stations located farther away from location monitor system 109, location monitor system 109 is able to receive signaling from at least one of base stations 104-108. The signaling may include any control channel or other type of channel that is capable of carrying an active set to a wireless communication device. In this example, location monitor system 109 concerned with signaling from base station 106 serving wireless sector C.

From the signaling of base station 106, location monitor system 109 identifies wireless device 101 from the signaling (step 202). Wireless device 101 may be identified based on a unique identifier for wireless device 101. The unique identifier may include an electronic serial number (ESN), a Unicast Access Terminal Identifier (UATI), or any other type of identifier for a single wireless device. The unique identifier is anonymous and actual mobile user identity information remains secured by the backend system of a wireless carrier operating base station 106. Therefore, location monitor system 109 simply recognizes that a wireless device exists due to the unique identifier and does not know that the wireless device, specifically, is wireless device 101.

Location monitor system 109 further identifies an active set carried in the signaling that is associated with wireless device 101 (step 204). The active set may be identified based on the unique identifier for wireless device 101. For example, a header for the active set may use the unique identifier of wireless device 101 to indicate that the active set is meant for wireless device 101 so that other wireless devices do not communicate based on an incorrect active set. The unique identifier for wireless device 101 may have been identified in step 202 from this same unique identifier that identifies the active set. In this example, the active set for wireless device 101 includes the PN IDs of wireless sectors C, A, and B. Wireless sector C is servicing wireless device 101 and wireless sectors A and B are available to wireless device 101 for handoff if conditions warrant. Other sectors may be included in the active set for wireless device 101 for sectors not illustrated in FIG. 1.

The active set may be contained within a traffic channel assignment message transferred to wireless device 101. The traffic channel assignment message is transferred to wireless device 101 from base station 106 in response to connection request and route update messages from wireless device 101. A connection request message is transferred by wireless device 101 when wireless device 101 requires access to the communication network provided by base station 106. A route update message contains Pilot PN signal strength and PN phase measurements conducted by wireless device 101 on the pilot signals within range of wireless device 101. Base station 106 uses these measurements to create the active set for wireless device 101. In this example, base station 106 determined using the measurements from a route update message that sectors A and B of base stations 104 and 105, respectively, had measurements sufficient to warrant being placed in the active set of wireless device 101.

Location monitor system 109 then determines a location of the wireless device 101 based on the active set (step 206). The location may be determined in any way that allows location monitor system 109 to receive a location that would be serviced by the active set of wireless device 101. The location may vary in precision based on the size of the active set. As more PN IDs are listed in the active set for wireless device 101, the size of the geographic location where wireless device 101 may be located diminishes. The size diminishes because the geographic area where the wireless sectors of the listed PN IDs overlap becomes smaller. Location monitor system 109 may rely on information provided by the wireless network operator(s) operating base stations 104-108 regarding the geographic coverage area of wireless sectors A-G in order to determine the location of wireless device 101. Alternatively, location monitor system 109 may rely on locations previously reported by wireless devices with various active sets, as discussed further below.

In some embodiments, location monitor system 109 may query a database that includes a location that corresponds to an active set of wireless sectors C, A, and B. The database may be stored locally on location monitor system 109 or location monitor system 109 may access a remote computer system containing the database using any of base stations 104-108 or some other wireless or wireline form of communication. A wireless network operator may provide the database after populating the database with possible locations corresponding to various active sets. The database may be populated using data received from wireless devices indicating a current location and active set of the wireless devices at various times. Alternatively, the wireless network operator may derive the location information for various active sets based on coverage areas for each wireless sector in an active set already known by the wireless network operator.

In some embodiments, location monitor system 109 receives signaling in wireless sectors A, C, and E from base stations 104, 106, and 107, respectively. The signaling contains information about sectors A, C, and E, including the geographic coordinates of base stations 104, 106, and 107. The information may be included in a sector parameters message from each of base stations 104, 106, and 107 and may further include the identity of the sector, the identities of neighboring sectors, and the number of channels in the sector. From the geographic coordinates of base stations 104, 106, and 107 location monitor system 109 is able to generate and display the locations of wireless device and base stations 104, 106, and 107 graphically on a map. Alternatively, location monitor 109 may send the location information to another computer system for display.

Since location monitor system is capable of receiving signaling from all of base stations 104-108, location monitor may perform the steps of FIG. 2 to further determine a location of both wireless device 102 and 103. Specifically, location monitor system 109 identifies a unique identifier for each of wireless devices 102 and 103 from signaling transferred from base stations 105 and 107 that are servicing wireless devices 102 and 103 in wireless sectors B and F, respectively. Location monitor system 109 then indentifies an active set for the two devices. From the active set B and E of wireless device 102 and the active set F, G, and D for wireless device 103, location monitor system 109 is able to determine a location of wireless devices 102 and 103 in the same way the location of wireless device 101 was determined.

Advantageously, location monitor system 109 can determine the location of wireless devices while any information about the wireless devices outside of their locations remains protected.

Referring back to FIG. 1, wireless communication devices 101-103 each comprise Radio Frequency (RF) communication circuitry and an antenna. The RF communication circuitry typically includes an amplifier, filter, modulator, and signal processing circuitry. Wireless communication devices 101-103 may also each include a user interface, memory device, software, processing circuitry, or some other communication components. Wireless communication devices 101-103 may each be a telephone, computer, e-book, mobile Internet appliance, wireless network interface card, media player, game console, or some other wireless communication apparatus—including combinations thereof.

Base stations 104-108 each comprise RF communication circuitry and an antenna. The RF communication circuitry typically includes an amplifier, filter, RF modulator, and signal processing circuitry. Base stations 104-108 may also comprise a router, server, memory device, software, processing circuitry, cabling, power supply, network communication interface, structural support, or some other communication apparatus.

Location monitor system 109 comprises Radio Frequency (RF) communication circuitry and an antenna. The RF communication circuitry typically includes an amplifier, filter, modulator, and signal processing circuitry. Location monitor system 109 may also include a user interface, memory device, software, processing circuitry, or some other communication components. Location monitor system 109 may be a dedicated device or may be part of a telephone, computer, e-book, mobile Internet appliance, wireless network interface card, media player, game console, or some other wireless communication apparatus—including combinations thereof.

The wireless links with base stations 104-108 use the air or space as the transport media. The wireless links may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format.

Figure 3:
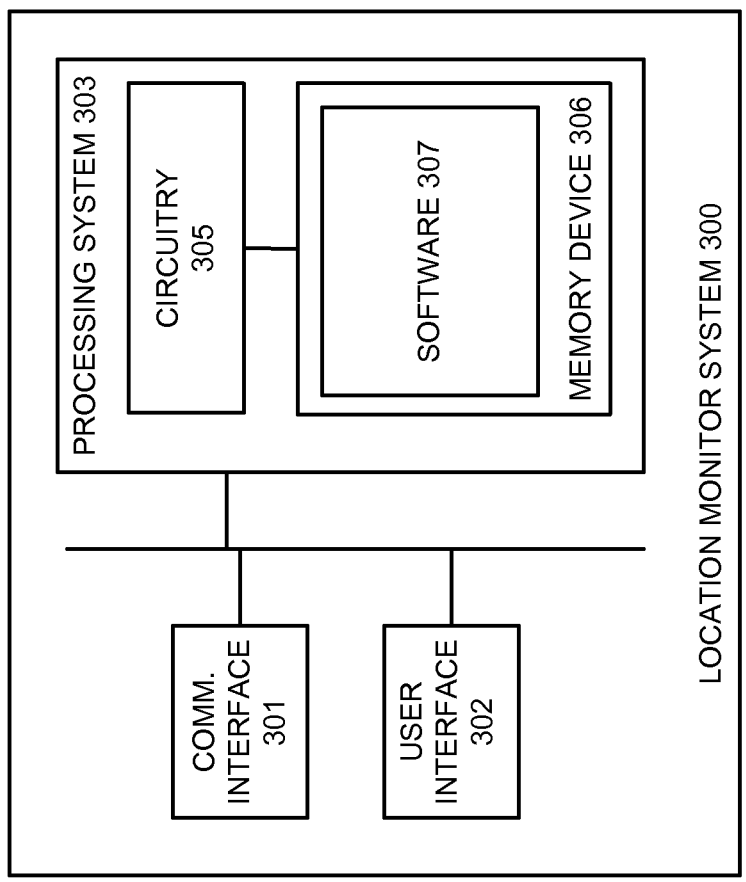
FIG. 3 illustrates a location monitor system for deriving a wireless device location from base station signaling.

FIG. 3 illustrates location monitor system 300 for deriving a wireless device location from base station signaling. Location monitor system 300 is an example of location monitor system 109, although device 109 could use alternative configurations. Location monitor system 300 comprises wireless communication interface 301, user interface 302, and processing system 303. Processing system 303 is linked to wireless communication interface 301 and user interface 302. Processing system 303 includes processing circuitry 305 and memory device 306 that stores operating software 307. Location monitor system 300 may include other well-known components such as a battery and enclosure that are not shown for clarity. Location monitor system 300 may be a telephone, computer, e-book, mobile Internet appliance, media player, game console, wireless network interface card, or some other wireless communication apparatus—including combinations thereof.

Wireless communication interface 301 comprises RF communication circuitry and an antenna. The RF communication circuitry typically includes an amplifier, filter, RF modulator, and signal processing circuitry. Wireless communication interface 301 may also include a memory device, software, processing circuitry, or some other communication device. Wireless communication interface 301 may use various protocols, such as CDMA, EVDO, WIMAX, GSM, LTE, WIFI, HSPA, or some other wireless communication format. Wireless communication interface 301 is configured to receive signaling transmitted by base stations serving a plurality of wireless communication devices.

User interface 302 comprises components that interact with a user to receive user inputs and to present media and/or information. User interface 302 may include a speaker, microphone, buttons, lights, display screen, touch screen, touch pad, scroll wheel, communication port, or some other user input/output apparatus—including combinations thereof. User interface 302 may omitted in some examples.

Processing circuitry 305 comprises microprocessor and other circuitry that retrieves and executes operating software 307 from memory device 306. Memory device 306 comprises a non-transitory storage medium, such as a disk drive, flash drive, data storage circuitry, or some other memory apparatus. Processing circuitry 305 is typically mounted on a circuit board that may also hold memory device 306 and portions of communication interface 301 and user interface 302. Operating software 307 comprises computer programs, firmware, or some other form of machine-readable processing instructions. Operating software 307 may include an operating system, utilities, drivers, network interfaces, applications, or some other type of software. When executed by processing circuitry 305, operating software 307 directs processing system 303 to operate location monitor system 300 as described herein.

In particular, operating software 307 directs processing system 303 to monitor the signaling transmitted by base stations serving a plurality of wireless communication devices. Operating software 307 further directs processing system 303 to identify a wireless communication device of the plurality of wireless communication devices from the signaling and identify an active set carried in the signaling that is associated with the wireless communication device. Operating software 307 further directs processing system 303 to determine a location of the wireless communication device based on the active set.

It should be understood that communication interface 301 may be part of a receiver system that is separate from processing system 303. Thus, processing system 303 and the receiver system may be connected by a communication link that may include various communication networks to exchange information. For example, the receiver system may be placed at a monitor location and the information received from the control signals at the monitor location may be transferred over a communication network to processing system 303. The information may be transferred in real time, periodically, or stored in a memory at the receiver system for transference at a later time. Alternatively, the two systems may be located very near one another. For example, receiver system may be contained within a device similar to a wireless aircard for a laptop and processing system 303 may be part of the laptop itself running software necessary to process data from the receiver system. A communication link between the receiver system and processing system 303 may include various interfaces, such as Universal Serial Bus (USB), needed to exchange communications between an aircard and a laptop.

Figure 4:
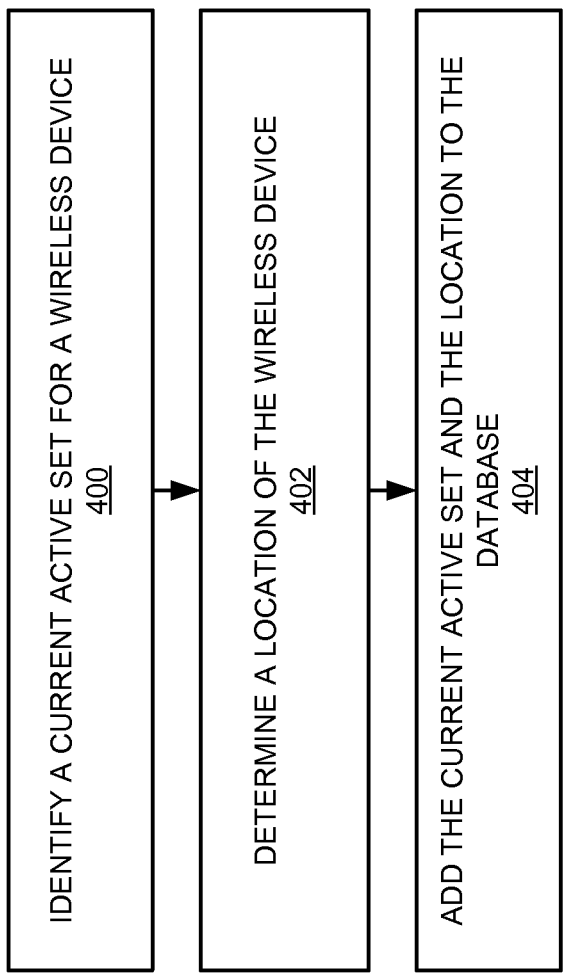
FIG. 4 illustrates the operation of the wireless communication system for populating an active set location database.

FIG. 4 illustrates the operation of wireless communication system 100 for populating an active set location database. In operation, the steps of FIG. 4 may be performed in a wireless communication device similar to wireless devices 101-103 of FIG. 1. Similarly, an application executing on a wireless device may instruct the wireless device to perform the steps of FIG. 4. For example, employees or customers of a company, such as a wireless network operator, that supplies location monitor system 109 may have an application installed on their device that populates the active set location database over time while using their device.

Alternatively, the steps may be performed in a system of the wireless communication network over which the wireless device communicates, including a system similar to location monitor system 109, or by some combination of wireless devices and systems.

The operation of FIG. 4 begins by identifying a current active set for a wireless communication device (step 400). The current active set can be identified from the base station servicing the wireless device, the wireless device itself, or from any other system that is capable of retrieving the current active set for a wireless device. The operation then determines a location of the wireless device (step 402). The location of the wireless device is the location of the wireless device at the same time the wireless device is using the current active set. The location of the wireless device may be determined using a Global Positioning System (GPS) receiver in the wireless device, using base station triangulation or some other form of network assisted location determination method, or using any other method for determining the location of the wireless device.

Once the current active set and location are determined for the wireless device, the current active set and the location are added to a database of locations corresponding to various active sets (step 404). The database may be supplied with more entries from the wireless device in order to increase the number of entries in the database. As the database is populated with more entries more active sets and more locations for each active set are added to the database, which thereby increases the accuracy of location monitor system 109.

Information about the current active set and current location of a wireless device may be transmitted to the database periodically. This allows for the database to be populated with a diverse location base, including multiple locations for a wireless device that correspond to the same active set. Alternatively, location and active set information may be transmitted every time a wireless device receives a new active set, every time the wireless device moves a threshold distance from a previously reported location, whenever the reporting application is launched or triggered on the wireless device, or any other way of controlling how often the database is populated.

Figure 5:
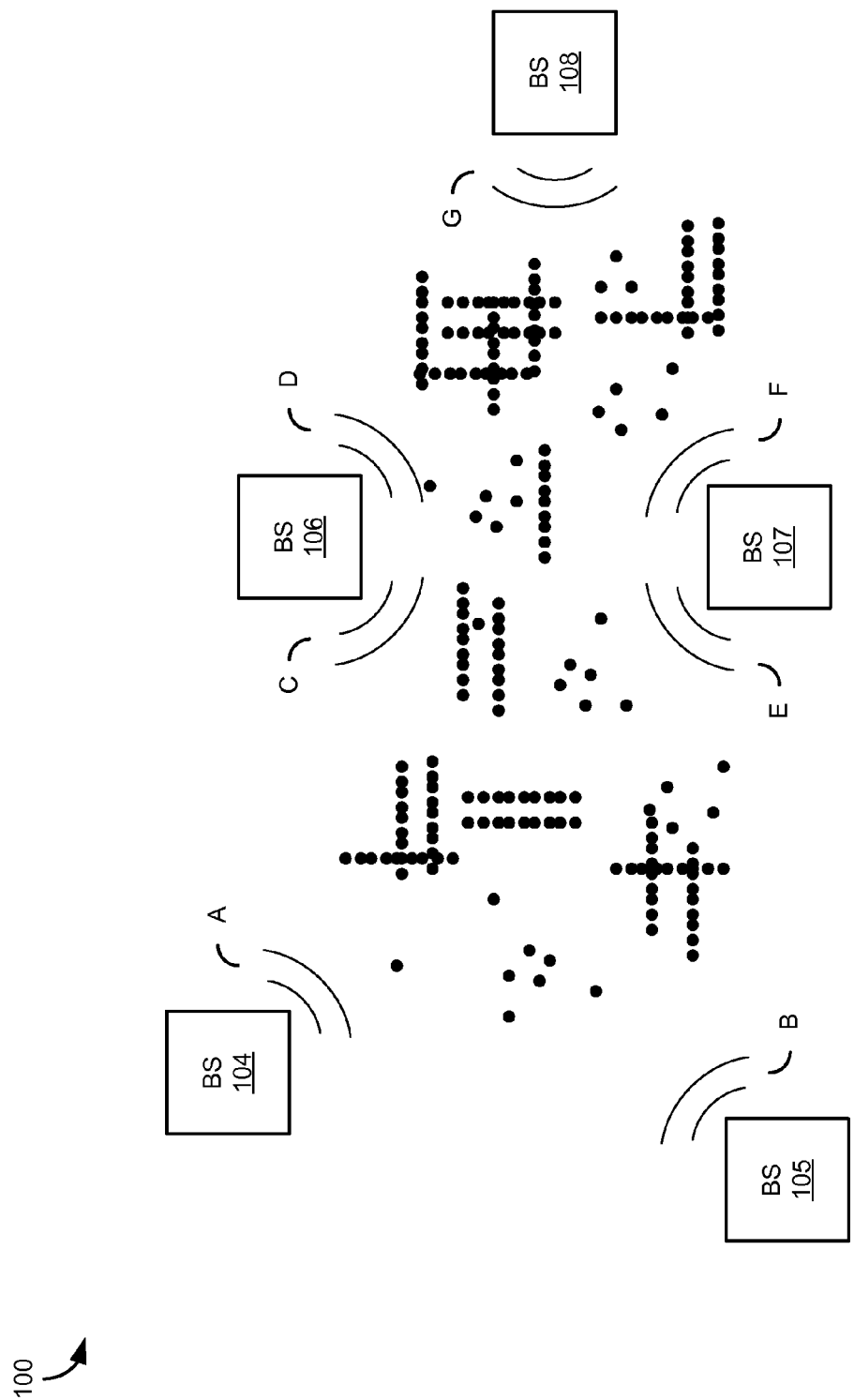
FIG. 5 illustrates the wireless communication system for populating an active set location database.
Figure 6:
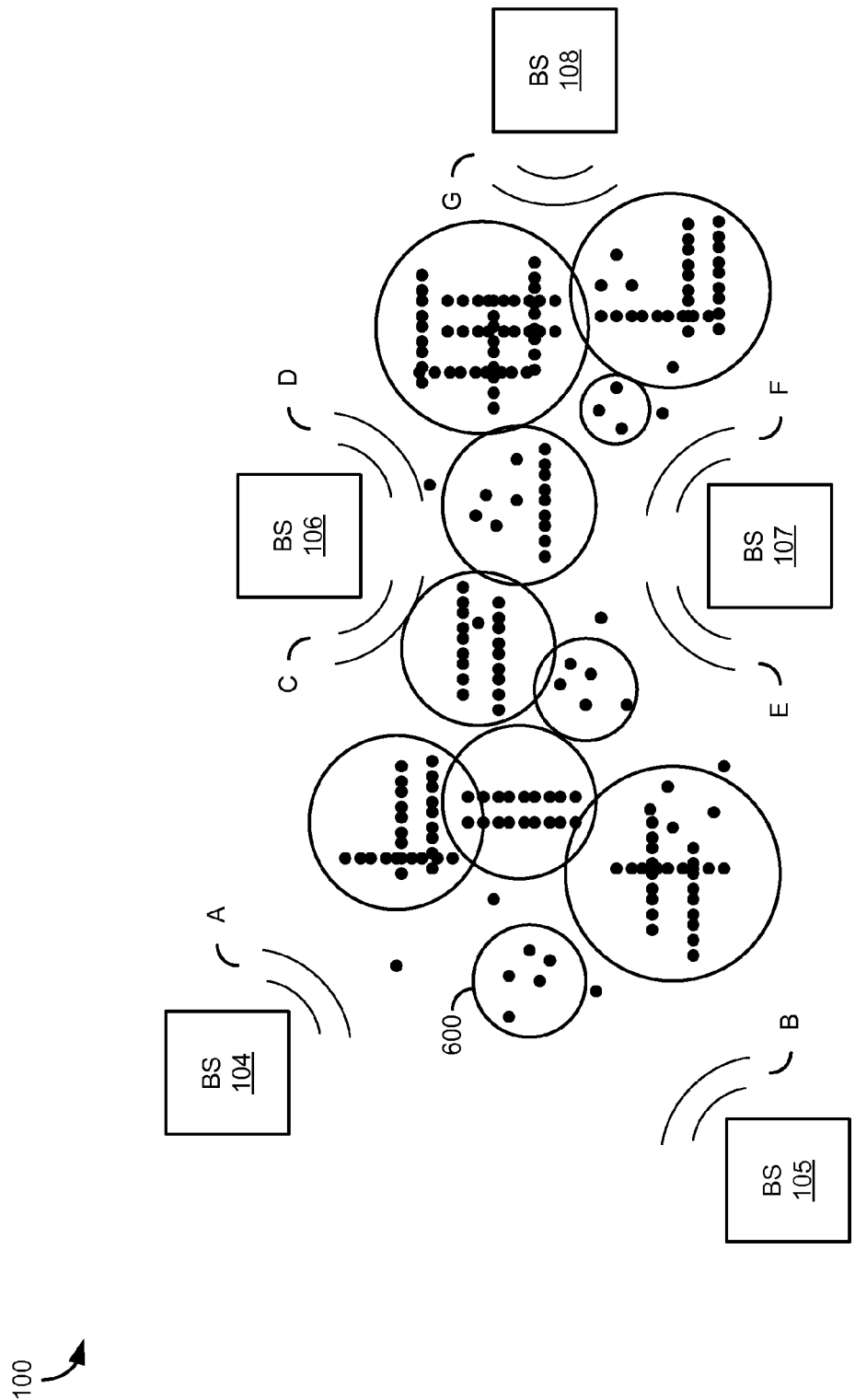
FIG. 6 illustrates the wireless communication system for populating an active set location database.
Figure 7:
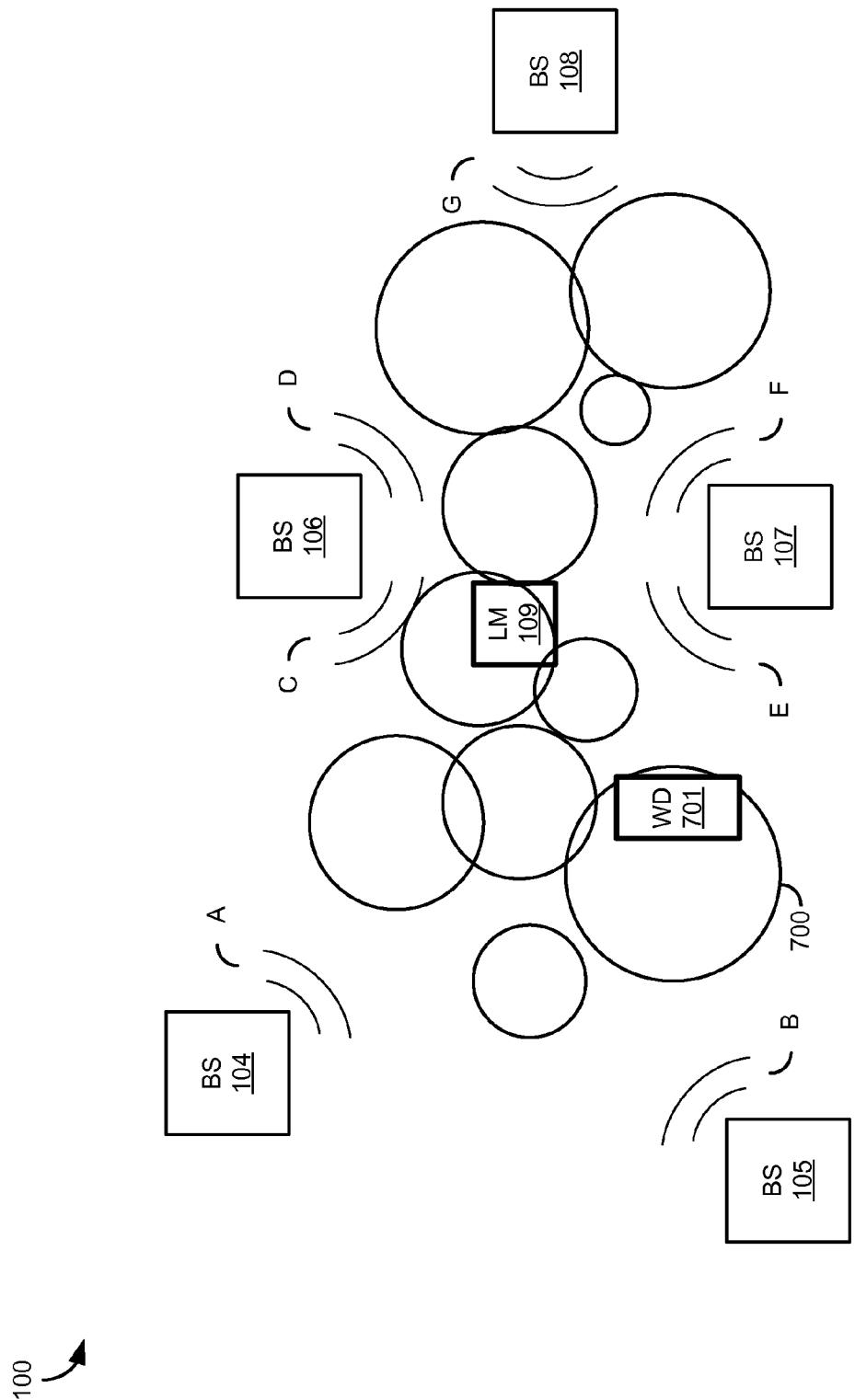
FIG. 7 illustrates the wireless communication system for populating an active set location database.

FIGS. 5-7 are a visualization of the methods described above for populating an active set location database and using the database to determine the location of a wireless device.

FIG. 5 illustrates locations of wireless devices that have supplied data for database population within communication system 100. While not necessarily drawn to scale, each dot represents a geographic location of a wireless device. The dots may be representative of locations supplied by a single wireless device or may be supplied by multiple wireless devices. When the database receives the location information corresponding to each dot, the database further receives information containing the active set for the wireless device at the location. Therefore, each dot in FIG. 5 represents a location and an active set for a location that is stored in a data structure of the database.

After the database has received the location and active set information described in FIG. 5, the database creates geo fences 600 as shown in FIG. 6 for the geographic area covered by communication system 100. While geo fences 600 are illustrated as being circular, geo fences 600 may take any possible shape. Each individual geo fence 600 contains the locations of wireless communication devices that have a specific active set. The geo fences 600 may be generated by the database as a location to return when queried by location monitor system 109 about a particular active set or location monitor system 109 may receive all locations for the particular active set and derive the geo fence itself. As can be seen in FIG. 6, as more widespread locations are obtained for a given active set, the geographic area represented by the geo fence 600 for that active set grows. This allows for the geo fences 600 to provide a better representation of the possible geographic area where a wireless device may be located with a particular active set.

FIG. 7 illustrates how population monitor 109 uses the geo fences 600 to derive a location of wireless communication device 701 in communication network 100. Location monitor system 109 monitors signaling from base stations 104-108 to obtain a unique identifier for wireless device 701. Location monitor system then identifies an active set transferred to wireless device 701 from one of base stations 104-108. The active set for wireless device 701 is then used by location monitor system 109 to query the database described above. Based on the query to the database, location monitor system 109 determines that the active set of wireless device 701 corresponds to geo fence 700. Therefore, without knowing any other information about wireless device 701, location monitor system 109 recognizes that a wireless device is located in or near geo fence 700.

After location monitor system 109 has recognized that a wireless device is located in geo fence 700, location monitor system 109 displays a map of the area that geo fence 700 covers. In addition to the geo fence area, location monitor system 109 may also display on the map the locations of base stations contained within the active set of geo fence 700. To determine the locations of the base stations, the database from where location monitor system 109 received geo fence 700 may also include the geographic locations of the base stations contained within the active set of geo fence 700. Alternatively, location monitor system 109 may identify the locations for at least the base stations contained within the active set from sector parameters messages transferred in received base station signaling. To display the map, location monitor system 109 may include a display, such as a computer monitor, or may transfer the information necessary to display the map to another system. In some embodiments, the map may show additional wireless devices and geo fences.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system, comprising:
identifying active sets of wireless base stations generated by wireless communication devices;
determining locations of the wireless communication devices that correspond to the active sets and associating the active sets and the corresponding locations in a database;
receiving one of the active sets for an additional wireless communication device; and
processing the one of the active sets for the additional wireless communication device in the database to yield a corresponding location of the additional wireless communication device.

2. The method of claim 1, further comprising:
identifying a locations of the wireless base stations in the one of the active sets; and
graphically displaying the location of the additional wireless communication device and the locations of the wireless base stations on a map.

3. The method of claim 1, wherein receiving the one of the active sets for the additional wireless communication device comprises:
monitoring signaling wirelessly transferred from one of the wireless base stations.

4. The method of claim 1, wherein receiving the one of the active sets for the additional wireless communication device comprises:
monitoring signaling wirelessly transferred from the additional wireless communication device.

5. The method of claim 1, wherein identifying the active sets and determining the locations of the wireless communication devices comprises receiving data from applications executing on the wireless communication devices.

6. A wireless communication system, comprising:
a processor configured to identify active sets of wireless base stations generated by wireless communication devices;
the processing system configured to determine locations of the wireless communication devices that correspond to the active sets and associating the active sets and the corresponding locations in a database;
a wireless communication interface configured to receive one of the active sets for an additional wireless communication device; and the processor configured to process the one of the active sets for the additional wireless communication device in the database to yield a corresponding location of the additional wireless communication device.

7. The wireless communication system of claim 6, further comprising:

the processing system configured to identify locations of the wireless base stations in the one of the active sets; and a display system configured to graphically display the location of the additional wireless communication device and the locations of the wireless base stations on a map.

8. The wireless communication system of claim 6, wherein the wireless communication interface configured to receive one of the active sets for the additional wireless communication device comprises monitoring signaling wirelessly transferred from one of the wireless base stations.

9. The wireless communication system of claim 6, wherein the wireless communication interface configured to receive one of the active sets for the additional wireless communication device comprises monitoring signaling wirelessly transferred from the additional wireless communication device.

10. The wireless communication system of claim 6, wherein the active sets and the corresponding locations of the wireless communication devices are transferred from applications executing on the wireless communication devices.

11. The wireless communication system of claim 6, wherein the wireless communication interface and the processing system are components of a wireless communication device.

12. A wireless communication system, comprising:

a processor; and a non-transitory computer readable medium having instructions stored thereon that when executed by the processor, cause the processor to perform a method comprising identifying active sets of wireless base stations generated by wireless communication devices;

determining locations of the wireless communication devices that correspond to the active sets and associating the active sets and the corresponding locations in a database;

receiving one of the active sets for an additional wireless communication device; and processing the one of the active sets for the additional wireless communication device in the database to yield a corresponding location of the additional wireless communication device.

* * * * *